United States Patent
Fogg

(10) Patent No.: US 7,830,263 B2
(45) Date of Patent: *Nov. 9, 2010

(54) CLOSURE WITH RFID DEVICE

(75) Inventor: Martin Fogg, Bicester (GB)

(73) Assignee: Obrist Closures Switzerland GmbH, Reinach (CH)

( * ) Notice: Subject to any disclaimer, the term of this patent is extended or adjusted under 35 U.S.C. 154(b) by 162 days.

This patent is subject to a terminal disclaimer.

(21) Appl. No.: 12/295,681

(22) PCT Filed: Apr. 23, 2007

(86) PCT No.: PCT/GB2007/001473

§ 371 (c)(1),
(2), (4) Date: Dec. 30, 2008

(87) PCT Pub. No.: WO2007/125292

PCT Pub. Date: Nov. 8, 2007

(65) Prior Publication Data

US 2009/0173007 A1    Jul. 9, 2009

(30) Foreign Application Priority Data

Apr. 28, 2006    (GB) ................... 0608433.9

(51) Int. Cl.
*G08B 13/14*    (2006.01)
(52) U.S. Cl. ............... 340/572.7; 340/572.1; 235/439
(58) Field of Classification Search ............ 340/572.1, 340/572.7; 235/435, 439
See application file for complete search history.

(56) References Cited

U.S. PATENT DOCUMENTS

| 1,798,151 | A | 3/1931 | Fabrice |
|---|---|---|---|
| 2,858,054 | A | 10/1958 | Harkrader |
| 3,348,718 | A | 10/1967 | Musy |
| 3,412,890 | A | 11/1968 | Rich |
| 3,425,578 | A | 2/1969 | Owens |
| 3,455,479 | A | 7/1969 | Wilton |

(Continued)

FOREIGN PATENT DOCUMENTS

DE    809 896    8/1951

(Continued)

OTHER PUBLICATIONS

Serial No. PCT/EP2005/053441, completed Dec. 1, 2005, International Search Report and Written Opinion of the International Searching Authority, 5 pages.

(Continued)

*Primary Examiner*—Daniel Wu
*Assistant Examiner*—Ryan W Sherwin
(74) *Attorney, Agent, or Firm*—Lackenbach Siegel, LLP; Andrew F. Young

(57) ABSTRACT

A closure (10) and RFID device (15) in combination, wherein the closure comprises a metal shell and the RFID device comprises a tag (40) and antenna means (80). The tag (40) comprises an RFID chip (60) and an electrical circuit (50) and the antenna means (80) is adapted to be one side of a dipole. The RFID device is entirely located within the metal closure with and spaced from but electrically connected (70) to the metal closure (10) such that the closure becomes the other side of the dipole antenna.

19 Claims, 11 Drawing Sheets

U.S. PATENT DOCUMENTS

| | | | |
|---|---|---|---|
| 3,603,470 A | 9/1971 | Armour | |
| 3,810,556 A | 5/1974 | Coursaut | |
| 3,820,683 A | 6/1974 | Jasinski | |
| 3,871,545 A | 3/1975 | Bereziat | |
| 3,892,351 A | 7/1975 | Johnson et al. | |
| 4,091,949 A | 5/1978 | Fowles et al. | |
| 4,303,171 A | 12/1981 | Schremmer | |
| 4,310,105 A | 1/1982 | Gach | |
| 4,531,649 A | 7/1985 | Shull | |
| 4,569,464 A | 2/1986 | Wassilieff | |
| 4,637,519 A | 1/1987 | Dutt et al. | |
| 4,697,719 A | 10/1987 | Allen | |
| 4,750,312 A * | 6/1988 | de Vaujany | 53/307 |
| 4,790,442 A | 12/1988 | Gach | |
| 4,838,441 A | 6/1989 | Chernack | |
| 4,941,592 A | 7/1990 | Kitterman | |
| 4,942,970 A | 7/1990 | Jay | |
| 5,004,126 A | 4/1991 | Klesius | |
| 5,332,113 A | 7/1994 | Kusler et al. | |
| 5,427,260 A | 6/1995 | Mueller et al. | |
| 5,445,824 A | 8/1995 | Someya | |
| 5,588,545 A | 12/1996 | King et al. | |
| 5,603,422 A | 2/1997 | Herrmann | |
| 5,683,016 A | 11/1997 | Santagiuliana | |
| 5,755,348 A | 5/1998 | Luch et al. | |
| 5,819,965 A | 10/1998 | King et al. | |
| 6,036,036 A | 3/2000 | Bilani et al. | |
| 6,095,375 A | 8/2000 | Adams et al. | |
| 6,137,413 A * | 10/2000 | Ryan, Jr. | 340/572.8 |
| 6,269,986 B1 | 8/2001 | Gross | |
| 6,484,879 B2 | 11/2002 | Desmarais et al. | |
| 6,683,038 B2 | 1/2004 | Forth et al. | |
| 6,685,046 B2 | 2/2004 | Ogino | |
| 6,688,501 B2 | 2/2004 | DeGroot et al. | |
| 6,727,215 B2 | 4/2004 | Roberts et al. | |
| 6,866,164 B2 | 3/2005 | Branson et al. | |
| 6,880,729 B2 | 4/2005 | Stull et al. | |
| 7,121,419 B2 | 10/2006 | Ferry | |
| 7,125,828 B2 | 10/2006 | Catlin et al. | |
| 7,126,479 B2 * | 10/2006 | Claessens et al. | 340/572.1 |
| 7,204,383 B2 | 4/2007 | Hsu | |
| 2002/0125249 A1 | 9/2002 | Baird-Smith et al. | |
| 2004/0026420 A1 | 2/2004 | Smith | |
| 2004/0052202 A1* | 3/2004 | Brollier | 369/273 |
| 2004/0143505 A1 | 7/2004 | Kovach | |
| 2005/0133475 A1 | 6/2005 | Goto et al. | |
| 2005/0205607 A1 | 9/2005 | Hierzer et al. | |
| 2006/0011573 A1 | 1/2006 | Herald et al. | |
| 2006/0043052 A1 | 3/2006 | Lin | |
| 2006/0077062 A1 | 4/2006 | Andrechak et al. | |
| 2006/0124646 A1 | 6/2006 | Guglielmini et al. | |
| 2008/0190880 A1 | 8/2008 | Needham | |
| 2008/0277613 A1 | 11/2008 | Ramsey et al. | |
| 2009/0173007 A1 | 7/2009 | Fogg | |

FOREIGN PATENT DOCUMENTS

| | | |
|---|---|---|
| DE | 861 666 | 1/1953 |
| DE | 85 35 205 U | 2/1986 |
| DE | 3 605 963 | 8/1987 |
| DE | 200 19 797 U1 | 5/2001 |
| EP | 0 127 943 A1 | 12/1984 |
| EP | 0 132 792 A1 | 2/1985 |
| EP | 0 179 498 A1 | 4/1986 |
| EP | 0 236 136 A2 | 9/1987 |
| EP | 0 306 670 A2 | 3/1989 |
| EP | 0 337 568 A2 | 10/1989 |
| EP | 0 414 462 A2 | 2/1991 |
| EP | 0 593 952 A1 | 9/1993 |
| EP | 0 619 243 A1 | 10/1994 |
| EP | 0 688 723 A1 | 12/1995 |
| EP | 1 101 707 A1 | 5/2001 |
| EP | 1 266 839 A | 12/2002 |
| EP | 1 266 839 A2 | 12/2002 |
| EP | 1 283 175 A5 | 2/2003 |
| EP | 1 161 382 B1 | 9/2003 |
| EP | 2005/053085 | 6/2004 |
| EP | 0 425 391 71 | 6/2005 |
| EP | 1 694 576 B1 | 2/2008 |
| EP | 1 786 698 B1 | 9/2008 |
| EP | 1 663 809 B1 | 10/2008 |
| EP | 1 877 963 B1 | 12/2008 |
| FR | 2 439 139 A | 5/1980 |
| FR | 2 567 106 A | 1/1986 |
| FR | 2 591 571 A | 6/1987 |
| GB | 1 298 084 A | 11/1972 |
| GB | 1 473 482 | 5/1977 |
| GB | 1484517 | 9/1977 |
| GB | 2 123 392 A | 2/1984 |
| GB | 2 136 782 A | 9/1984 |
| GB | 2 148 235 A | 5/1985 |
| GB | 2 158 424 A | 11/1985 |
| GB | 2 172 803 A | 10/1986 |
| GB | 2 222 821 | 3/1990 |
| GB | 2 264 110 B | 8/1993 |
| GB | 2 311 283 A | 9/1997 |
| GB | 2 355 269 A | 4/2001 |
| GB | 2 356 842 A | 6/2001 |
| GB | 2 375 516 A | 11/2002 |
| GB | 2 430 667 A | 4/2007 |
| GB | 2 415 426 | 5/2007 |
| GB | 2 432 153 | 11/2007 |
| JP | 10 338251 A | 3/1999 |
| JP | 2000/229651 | 8/2000 |
| JP | 2003160162 A | 11/2001 |
| WO | WO 94/07470 A1 | 4/1994 |
| WO | WO 99/57031 A1 | 11/1999 |
| WO | 00/026878 A1 | 5/2000 |
| WO | WO 00/26878 A1 | 5/2000 |
| WO | WO 00/66451 A1 | 11/2000 |
| WO | WO 01/36290 A1 | 5/2001 |
| WO | WO 01/83668 A1 | 11/2001 |
| WO | WO 02/44047 A1 | 6/2002 |
| WO | WO 02/085730 | 10/2002 |
| WO | WO 02/096771 A1 | 12/2002 |
| WO | WO 03/016162 A1 | 2/2003 |
| WO | WO 03/016165 A1 | 2/2003 |
| WO | WO 2004/011347 | 2/2004 |
| WO | 2005/024745 A2 | 3/2005 |
| WO | WO 2005/024745 A2 | 3/2005 |
| WO | WO 2005/049443 | 6/2005 |
| WO | WO 2006/000532 A1 | 1/2006 |
| WO | WO 2006/003168 | 1/2006 |
| WO | WO 2006/008285 | 1/2006 |
| WO | WO 2006/020059 A2 | 2/2006 |
| WO | WO 2006/117505 | 11/2006 |
| WO | WO 2007/125292 A2 | 11/2007 |
| WO | WO 2009/056829 A1 | 5/2009 |

OTHER PUBLICATIONS

Serial No. PCT/EP2003/07798, mailed Oct. 15, 2004, International Search Report and Written Opinion of the International Searching Authority, 5 pages.
EP 1 663 809 B1 Documents related to EP Opposition (EP Patent Granted)—8 pages.
U.S. Appl. No. 10/577,575, filed Sep. 5, 2006, Skelton.
U.S. Appl. No. 12/664,961, filed Dec. 16, 2009, Skelton.
U.S. Appl. No. 12/666,630, filed Mar. 3, 2010, Skelton.
International Search Report dated Feb. 27, 2008; UK Application No. GB 0721330.9; 4 pages.
U.S. Appl. No. 11/913,595, filed Nov. 5, 2007, Fogg.

* cited by examiner

CLOSURE WITH RFID DEVICE

The present invention concerns an identification device and the combination of an identification device and a metallic closure for use with containers such as bottles of spirits or wines.

Identification systems, such as "EAS"—Electronic Article Surveillance systems, are known in which a tag is detected by appropriate means. However, these operate at a relatively low frequency (below 100 MHz) and typically only allow the detecting device to detect their presence or absence thereof.

Consequently, more advanced devices which can provide more information have been produced. These devices are known as radio frequency identification tags, also known as "RFID" tags. These devices have recently become widespread in the packaging industry.

The chip within the RFID tag can contain a relatively large amount of information which may be read, and/or in some cases written to, remotely by a reading device. The tag can be active in that it is powered by an incorporated battery to actively transmit a signal or, as is more typical, can be passive in that it is activated when an appropriate external radio signal is transmitted by a reading device and received by the RFID tag.

The information is typically concerned with the product to which the tag is attached. For instance the information can be the date the product was made, the source of the product, its weight, size, intended destination, stock number etc. US patent application published as US2004143505 discusses the use of RFID tags for inventory control.

This information is broadcast by the RFID tag using radio frequency radiation which can lie anywhere in the radio frequency range. However, ultra high frequency (UHF is typically defined as 300 to 3000 MHz) is preferred over low frequency for various reasons including that of increased range and use of smaller antenna requirements due to use of smaller wavelengths.

Although most RFID tags are readable when they are attached to the external surface of objects there are exclusions to this. For instance, if an RFID tag is placed on the surface of an object which is even slightly electrically conductive, for example metal or glass, the signal strength produced by the tag is greatly reduced. This is exacerbated by the presence of liquid inside the object. One way to overcome this is to place an insulating layer between the tag and the surface of the object. However, this layer has to be relatively thick, a feature which can detract from the aesthetics of the packaging. Further, surface mounted tags can be easily tampered with, or become accidentally damaged.

One way to overcome this problem is to place the tags inside the packaging. However, this can cause other problems in that the walls of the object can interfere with the radio signals and can even block them completely. This is especially the case when the walls are made of metal. In the packaging industry there is a desire to fit RFID tags to bottles. However, as discussed above, there are inherent problems with this. It has, however, been found that the closure can be used to hold the tag.

European patent EP 0619243 A describes a closure with an electromagnetically detectable device located therein. However, the device is located against the inside flat surface of the top plate of the closure. This means that if the closure is made of metal, which is often the case for spirit bottles, the device will not be readable remotely since the metal layer will interfere with the radio frequency radiation.

International patent application WO 0026878 describes how this may be overcome by locating part of the device perpendicularly below the closure such that it is outside of the metal closure walls. However, the presence of a device hanging down inside a bottle neck which would be visible to the consumer is undesirable for aesthetic reasons. Further, such a system would make the fitting of the closures to the bottles difficult without causing damage to the device due to the nature of present day high-speed filling and closure-fitting lines.

It is desirable to be able to fit RFID devices fully inside metal closures but still be able to read them remotely.

More recently, it has been proposed in international patent application WO 2005/024745 to provide an RFID tag on a container having a metal closure where the system is mounted within or externally of the metal closure. There is, however, a limit to the range at which a transmitted signal can be detected with such an arrangement.

In the applicant's co-pending European patent application (unpublished at the time of filing), there is disclosed an advance on the above-mentioned prior art in which the invention disclosed therein provides an RFID device and a closure and RFID device in combination. The closure comprises a metal shell and the RFID device comprises an RFID chip and antenna means. The antenna means is adapted to be one side of a dipole, and the RFID device is entirely located within the metal closure with the device electrically connected to the metal closure so that the closure becomes the other side of the dipole antenna.

As a further development, the applicants have found that, by adopting a similar approach to that disclosed in our aforesaid application, the same result can be achieved without necessarily having a direct physical electrical connection between the RFID device and the closure.

Thus, where used hereinafter, unless the context clearly determines otherwise, the expression "electrically coupled" includes indirect electrical contact including inductive coupling and capacitive coupling. This permits, where advantageous, the provision of a wad within the metal closure. it also has the advantage that lacquer coatings such as are commonly employed on closures such as bottle caps do not have to be removed or otherwise disrupted to establish electrical contact between the metal of the closure and the RFID chip According to one aspect of the present invention there is provided an RFID device for a closure comprising an electrically conductive shell, the device comprising a tag and antenna means, the tag comprising an RFID chip and the antenna means comprising one side of a dipole, the device being, in use, entirely located within a metal closure and spaced therefrom but electrically coupled thereto such that the closure becomes the other side of the dipole.

According to a further aspect there is provided a closure and RFID device in combination, wherein the closure comprises an electrically-conductive shell and the RFID device comprises a tag and antenna means, the tag comprises an RFID chip, and the antenna means is one side of a dipole, the RFID device being entirely located within the closure and spaced from but electrically coupled to the closure so that the closure becomes the other side of the dipole.

The spacing may be as a result of, for example, an air gap, a sealing wad or a layer of lacquer, all of which would have an insulating effect.

By electrically coupling the RFID tag to the closure, such that the closure becomes one side of a dipole antenna, it has been found that it is possible to remotely read the RFID tag. This reading may occur both at the sides and above the closed end of the closure.

Two major advantages of a non-contact tag are: i) that the tag can be hermetically sealed within the insert; and ii) that inside of the metal closure can be entirely lacquered.

The antenna may be of various shapes. Each different shape produces a differently shaped radiation pattern. It is considered to be useful to be able to influence the shape of the radiation pattern produced by the device for differing applications. An example of a suitable shape is a cone.

In one embodiment, a spacer is used to bring the device closer to the open end of the closure. This further enhances the strength of the signal measured remotely and therefore increases the distance over which the tag may be read.

In another embodiment of the invention, the device is positioned inside an insert to protect it.

In yet another embodiment the antenna can be made to contact a liquid contained in an associated container. This has the advantage of boosting the strength of the radio frequency field.

In another aspect, the invention provides a closure and RFID device in combination, wherein the closure comprises an electrically-conductive shell and the RFID device comprises an RFID chip and antenna means, and the antenna means is adapted to be one side of a dipole, and the RFID chip being spaced from but electrically coupled to the electrically-conductive closure so that the closure becomes the other side of the dipole antenna, the closure and RFID device combination being associated with a body of liquid, and the antenna means being in contact with the body of liquid.

The shell is a closure such as a closure cap for a bottle which may be threaded for securing on a threaded neck of a bottle such as may contain wine, spirits or liqueurs. The shell may be formed of metal or may be of a metallised material such as a suitable plastics material coated with a functional and/or decorative metallic coating on its interior and/or exterior surfaces. It will also be appreciated from an understanding of the ensuing description that the invention is equally applicable to and useful for closures of the type which provide a push-fit in the neck of a bottle.

The present invention also provides, in another aspect, a closure and RFID device in combination, wherein the closure comprises a member which is arranged to provide a tight sealing fit within a neck of a container, the closure comprising electrically-conductive material and/or being coated with electrically-conductive material, and wherein the RFID device comprises an RFID chip and antenna means, and is accommodated within the member, and the antenna means is one side of a dipole, and the RFID device being entirely located within the closure and spaced from but electrically coupled to the closure so that the closure becomes the other side of the dipole.

According to a further aspect there is provided a closure and RFID device in combination, wherein the closure comprises a metal shell and the RFID device comprises a tag and antenna means, wherein the tag comprises an RFID chip and an electrical circuit, and wherein the antenna means is adapted to be one side of a dipole, and the RFID device is entirely located within the metal closure with the electrical circuit electrically coupled to the metal closure so that the closure becomes the other side of the dipole antenna.

The invention further provides, in another aspect, a closure and RFID device in combination, wherein the closure comprises a member which is arranged to provide a tight sealing fit within a neck of a container, the closure comprising electrically-conductive material and/or being coated with electrically-conductive material, and the RFID device comprising an RFID chip and antenna means, and the antenna means being adapted to be one side of a dipole, and the RFID chip being spaced from but electrically coupled to the electrically-conductive closure so that the closure becomes the other side of the dipole antenna, the closure and RFID device combination being associated with a body of liquid, and the antenna means being in contact with the body of liquid.

The invention is applicable to closures such as bottle caps and stoppers and to closures for aerosol spray containers and like.

Embodiments of the invention will now be described, by way of example, with reference to the following drawings in which.

Figure 1:
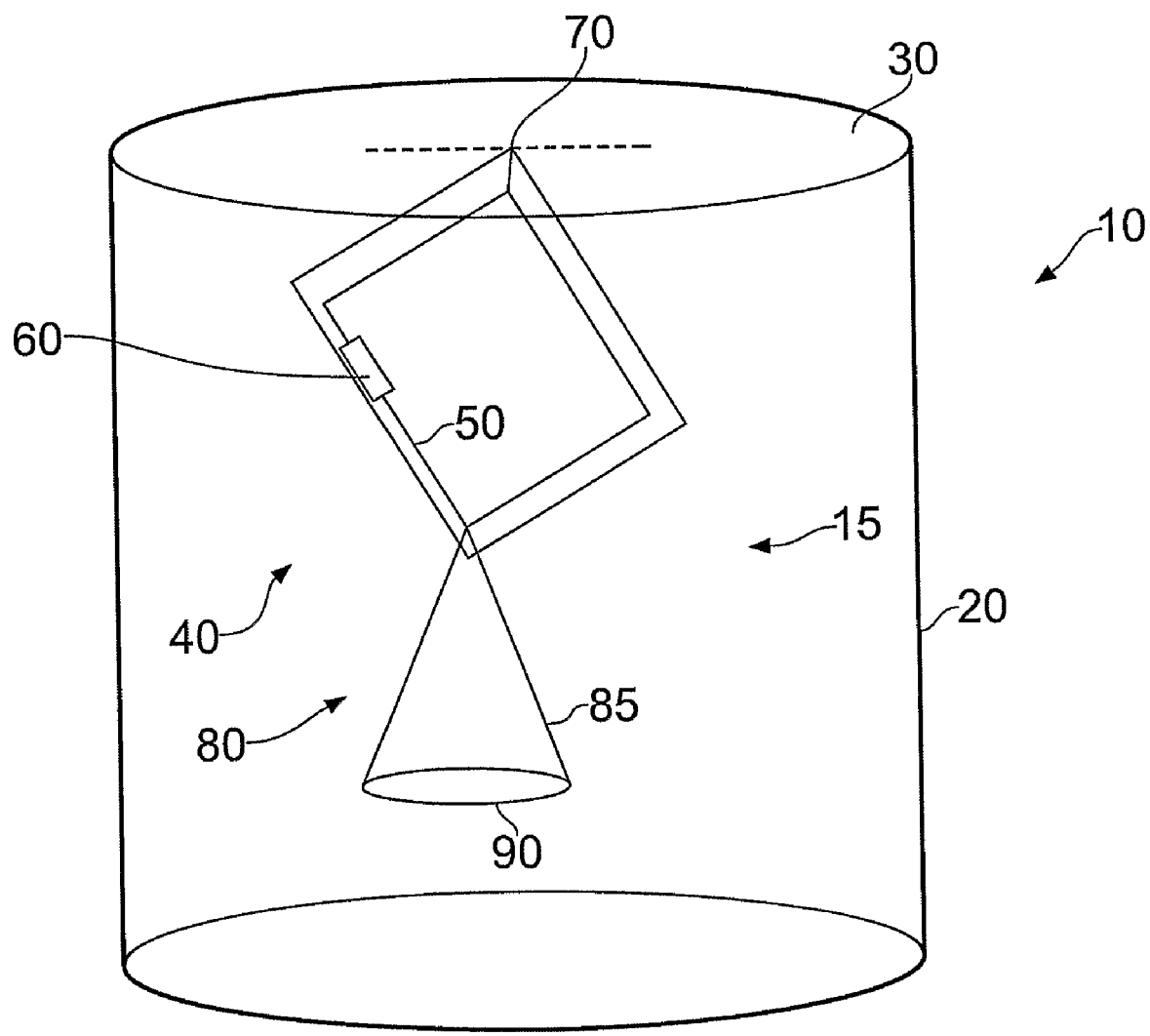
FIG. 1 shows diagrammatically a side view of a combination of a closure with an RFID tag and antenna according to one embodiment of the invention.

In FIG. 1, a closure is generally indicated 10. The closure 10 is formed from aluminium and has a crown 30 and a depending skirt 20. In use, the skirt 20 would sit around and outside a container neck (not shown) in a manner generally understood. Accordingly, the skirt 20 may have a screw thread or snap bead or other means formed therein for retaining the closure to the container neck.

Also shown in FIG. 1 is an RFID device 15 comprising a tag 40 and an antenna 80. The tag 40 comprises a substrate in the form of a rectangular plane circuit board 45 on which an RFID chip 60 is located. The antenna 80 is connected to the circuit board 45 and a rectangular loop 50 of conducting material (e.g. copper) acting as an impedance circuit is located on the circuit board 45 for connecting the RFID chip 60 and the antenna 80 together. The function of the loop 50 is to match the impedance of the antenna to the lower impedance of the chip. The loop 50 may be shaped into any suitable form, such as a triangular or circular.

The circuit 50 is connected to the underside crown 30 of the closure 10 at connection point 70. This connection may be achieved by soldering or other such well known methods. The underside of the crown 30 is coated by a thin layer of lacquer (not shown), which physically spaces and insulates the circuit loop 50 from the electrically conductive metal closure shell. However, electrical conduction can occur between the loop 50 and the closure by induction. In this way the closure 10 becomes the other one side of a dipole antenna.

The RFID tag 40 is mounted so that, while not in direct physical and electrical contact with the closure 30, by positioning the tag sufficiently closely to the closure, the same result can be achieved provided that the RFID is responsive to signals within certain frequency ranges. It has been found that positive results have been obtained with a passive RFID with signals in the range of 800 MHz to 900 MHz and more specifically in the range 860 to 870 MHz.

Though reference is made to the closure 10 being of metal, it is to be clearly understood that the closure may be made from other materials which are electrically-conductive, including suitable plastics materials which may be coated or impregnated with electrically conductive materials.

The tag 40 is held in the closure 10 such that it depends downwardly from the crown 30 towards the open end of the closure 10. Although the tag 40 is shown as depending by one corner so that the sides of the substrate are not parallel with the sides of the closure 10, this is not essential and in fact the tag 40 could lie square with the closure sides. However, it has been found that, if the substrate is positioned substantially parallel to the crown 30, the strength of the signal is reduced such that it is difficult to read the tag remotely from the closure.

The antenna 80 is shown in the form of two diverging wires 85 extending downwardly (i.e. towards the open end of the closure 10) from the RFID tag 40. This antenna acts as the other side of the dipole antenna to the closure shell.

A further optional wire is shown in the form of a loop 90 which has its major plane parallel to the plane of the crown 30 of the closure 10. The loop 90 connects between the two wires 85 at their ends opposite their connection to the loop 50. Although the antenna 80 has been shown in this form it can take other forms such as a single straight wire or a cone of metal foil wherein the apex of the cone is connected to the substrate. All of these forms have the effect that the antenna becomes circularly polarised. Further, whichever form is employed, it has been found that the antenna 80 need not extend downwardly beyond the edge of the closure 10 for the RFID chip 60 to still be read by the reader.

The RFID chip 60 is a standard UHF RFID transponder integrated circuit which operates in the range 860 to 960 MHz, preferably 869 MHz. One example of such a chip is called "AMS3981". To read the RFID tag 40 a standard reader is used. For instance a Bistar MR100 Reader could be used.

It will be noted that the RFID device 15 is contained entirely within the closure 10 i.e. no part of the device projects beyond the open end of the skirt 20.

It has been found that, in one embodiment, if the antenna 80 is allowed to make contact with a body of liquid it has the effect that the strength of the signal is boosted so that the RFID tag 40 can be read from a greater distance. However, the antenna in this case needs to be insulated from electrical conduction with the liquid, for example by means of a non-electrically conducting layer of plastics material. Further, the antenna (80) should, in this case, contact the liquid outside of the closure.

Figure 2:
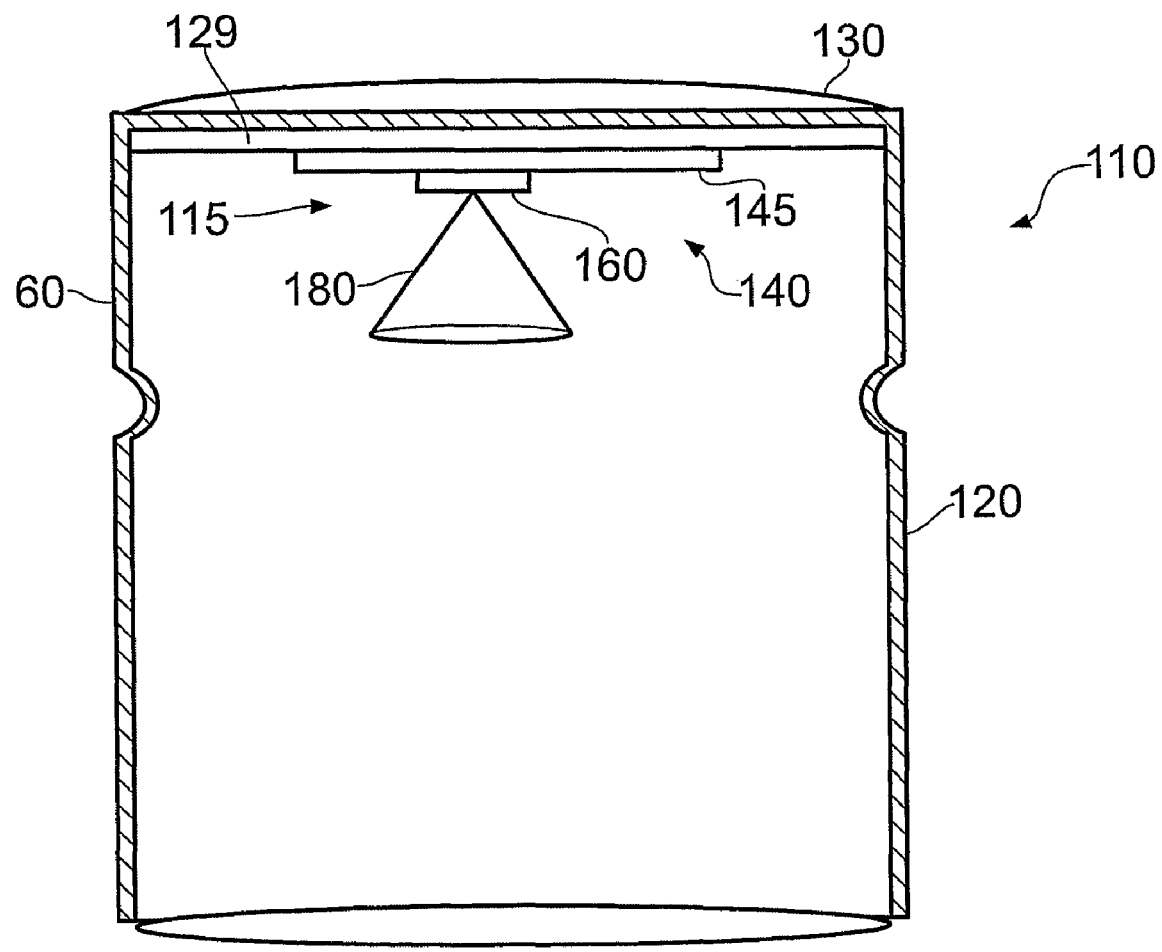
FIG. 2 shows diagrammatically a side view of a combination of a closure with an RFID tag and antenna according to another embodiment of the invention.

Referring now to FIG. 2 there is shown an alternative embodiment.

A closure is generally indicated 110 and comprises a crown 130 and a depending skirt 120. An RFID device is generally indicated 115 and comprises a tag 140 and an antenna 180.

The tag 140 comprises a circuit board 145 on which an RFID chip 160 is located. The antenna 180 comprises a cone of metal foil material and is connected directly to the chip 160 i.e. there is no circuit loop.

The closure 110 has a sealing wad 129 in the form of a cardboard disk which is fitted into the closed end, where it abuts against the underside of the crown 130.

The device 115 is mounted behind the wad 129 i.e. with the wad interposed between the device 115 and the closure crown 130. The device 115 is retained in position by adhering the board 145 to the sealing wad 129.

The tag 140 is mounted adjacent the underside of the crown 130 with the board 145 running parallel to the crown 130 and with the antenna 180 depending from the chip 160.

The "contactless" principles of the present invention permit the inclusion of the sealing wad 129. The wad 129 gives a 2 mm spacing between the device 115 and the closure 110 but electrical coupling still occurs in use.

Figure 3:
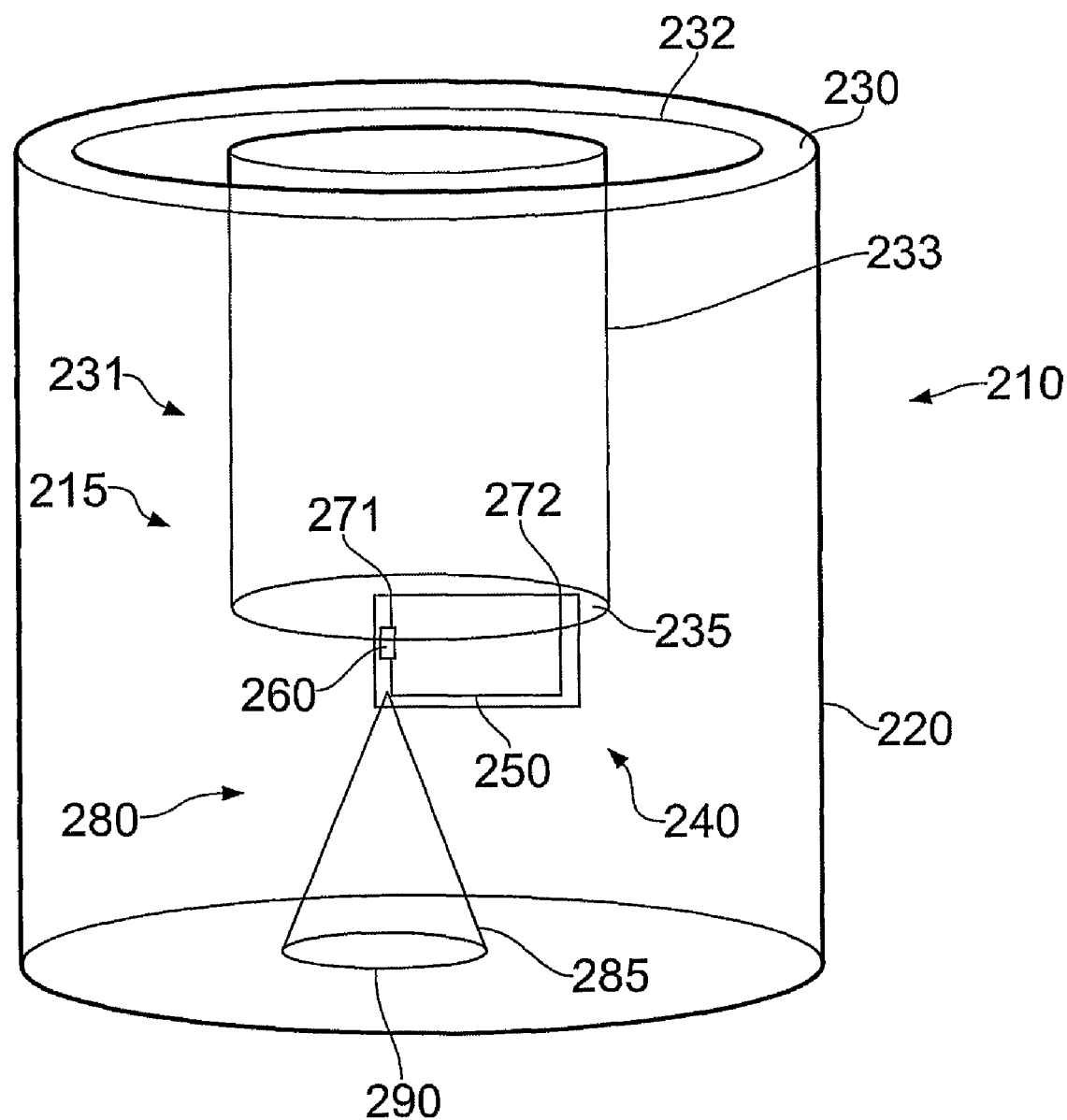
FIG. 3 shows diagrammatically a side view of a combination of a closure with an RFID tag and antenna according to yet another embodiment of the invention.

FIG. 3 shows a variation of the arrangement depicted in FIG. 1. Instead of the tag 240 being positioned immediately underneath the crown 230, it is positioned at a certain distance away. This is achieved by inserting an electrically conducting inverted "top-hat" shaped spacer 231 into the closure 210.

The spacer 231 has a base 232 which is in contact with the lacquer layer of the crown 230. Depending downwardly from the base 232 is a cylindrical wall 233 which has an end plate 235. The purpose of the spacer 231 is to distance the tag 240 from the crown 230, so that the antenna 280 is closer to the open end of the closure 210, while keeping the circuit 250 connected to the crown 230 such that the closure acts as one side of the dipole antenna. Accordingly, the spacer 231 does not need to be a "top-hat" shape but could be other shapes so long as it fulfils the stated purpose. The spacer can be made from copper or other electrically conductive materials, including some plastics, to improve conductivity.

The circuit 250 is shown as being connected at each of ends two 271, 272 to the end plate 235. However, this is not critical and the circuit could be connected in the same manner as shown in FIG. 1. Furthermore, the various antennas described in relation to FIG. 1 may also be employed.

Figure 4:
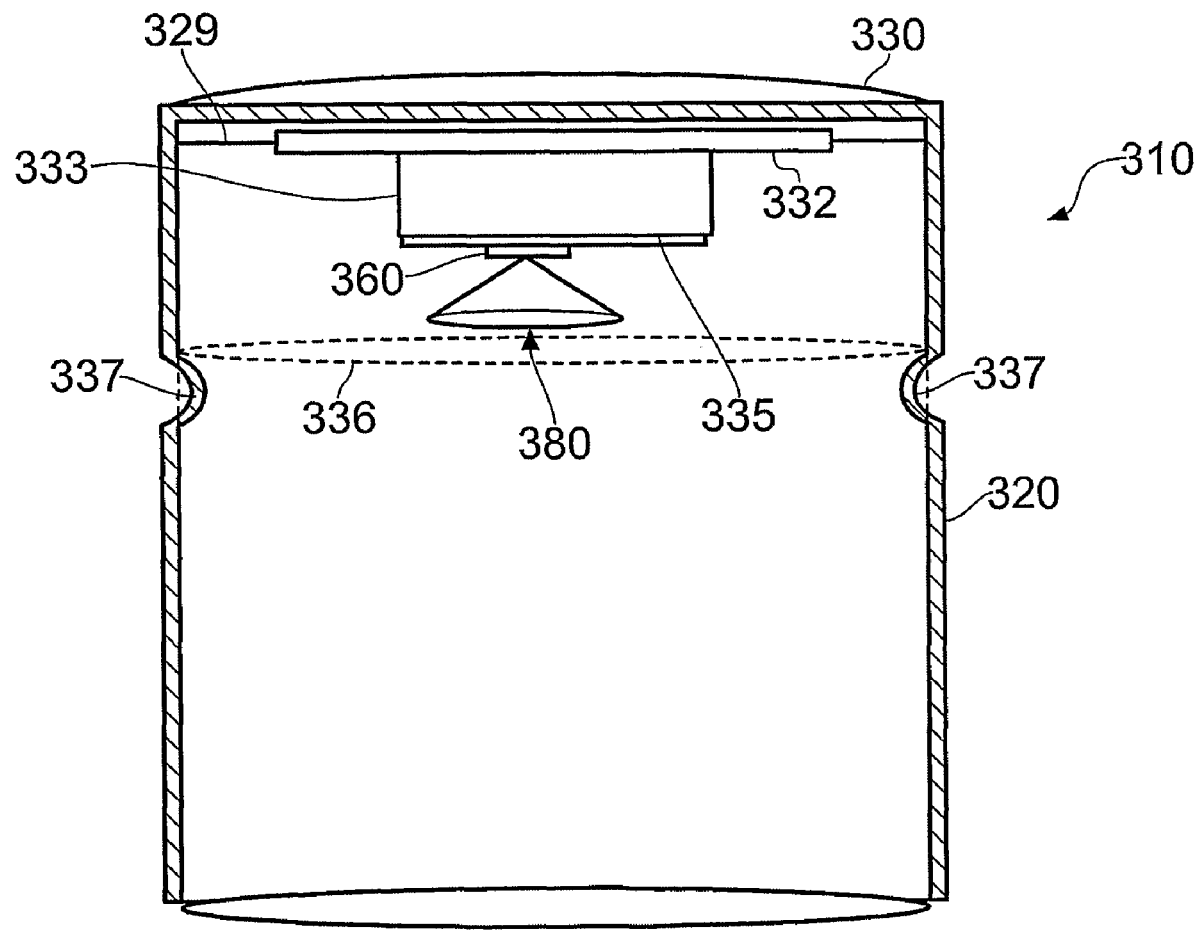
FIG. 4 shows diagrammatically a side view of a combination of a closure and an RFID device according to a further embodiment.

Referring now to FIG. 4 there is shown a closure 310 with a sealing wad 329. A device 315 similar to the device 215 shown in FIG. 3 is mounted in the closure.

Again, this arrangement, as with that of FIG. 3, is implemented with the spacer 333 not in direct electrical contact with the closure, in this case due to the wad 329. The base 332 can be mounted within the closure and be of dimensions such that the RFID chip is spaced from but in close proximity to the closure. The cylindrical wall 333 is shortened axially so that the end plate 335 is closer to the crown 350 of the closure 310 than in FIG. 3, while the tag 340 is mounted on the end plate 335. The device 315 is held in position by a retaining disc 336 held in position by internally directed crimpings 337 of the skirt 320.

Figure 5:
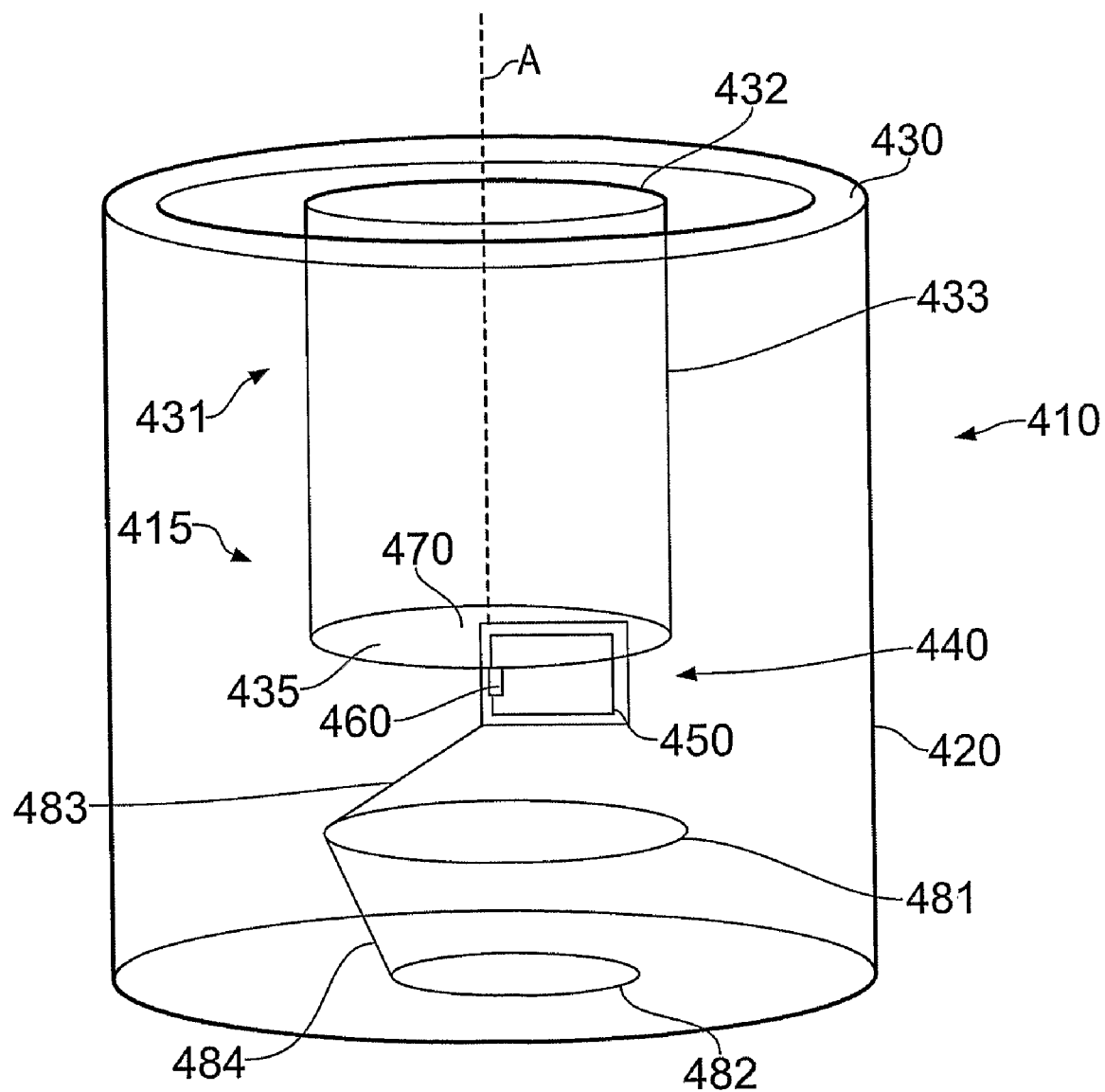
FIG. 5 shows diagrammatically a side view of a combination of a closure and an RFID device according to a still further embodiment.

FIG. 5 shows a variation of the embodiment shown in FIG. 3. The central axis "A" of the closure 410 is indicated with a broken line. In this Figure it can be seen that the lower antenna has been replaced by two plates 481, 482 positioned perpendicularly to axis "A". The plates 481, 482 are in the form of copper discs.

The plates 481, 482 are suspended below, and electrically connected to, the tag 440 by means of connectors 483, 484; such connections can be provided by copper wires. The plates 481, 482 act as one side of the dipole antenna (in the same way that the antenna 280 does) and act to increase the area of one side of the dipole antenna. Although two discs are shown, other numbers of discs, including only one, would function. Also, shapes other than circular discs may be used.

It will also be noted that the chip 460 is aligned with the central axis "A" of the closure 410. This improves the regularity of the radiation pattern produced by the device which improves reading of the tag 440.

Figure 6:
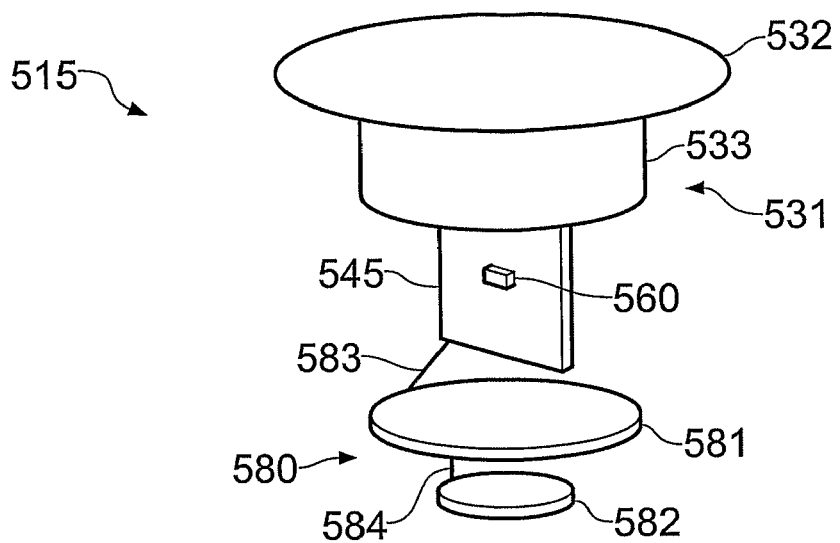
FIG. 6 is a perspective view of an RFID device formed according to the present invention.
Figures 7A, 7B:
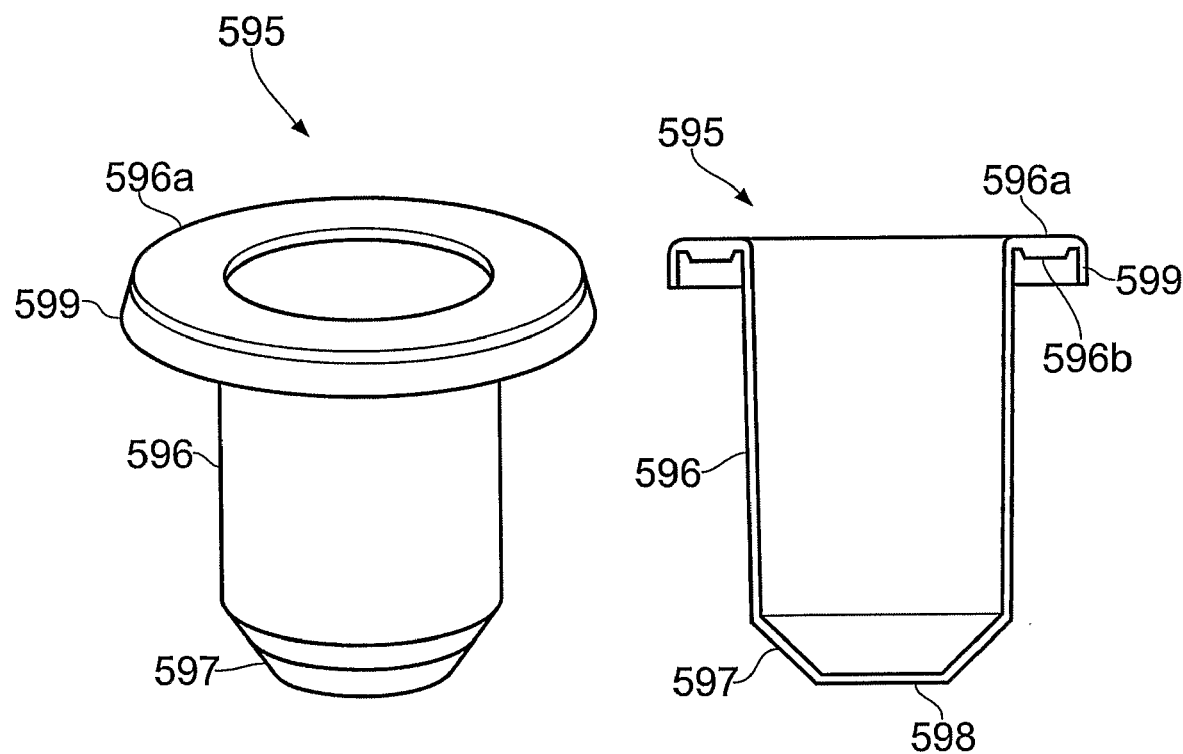
FIG. 7A is a perspective view of an insert for use in combination with an RFID device formed in accordance with the present invention.
FIG. 7B is a section of the insert of FIG. 7A.

FIG. 6 shows a device 515 similar to the device 415 in FIG. 5 and adapted to fit within an insert 595 shown in FIGS. 7A and 7B. The device 515 and insert 595 are shown fitted together in FIGS. 6A and 6B and the device/insert are shown fitted into a metal closure 310 in FIG. 9. The device/insert/closure are shown fitted onto a container neck in FIG. 10.

Referring first to FIG. 6 the device 515 comprises a spacer 531, a circuit board 545 and an antenna 580 and accordingly is similar to the device shown in FIG. 5.

Figure 8A:
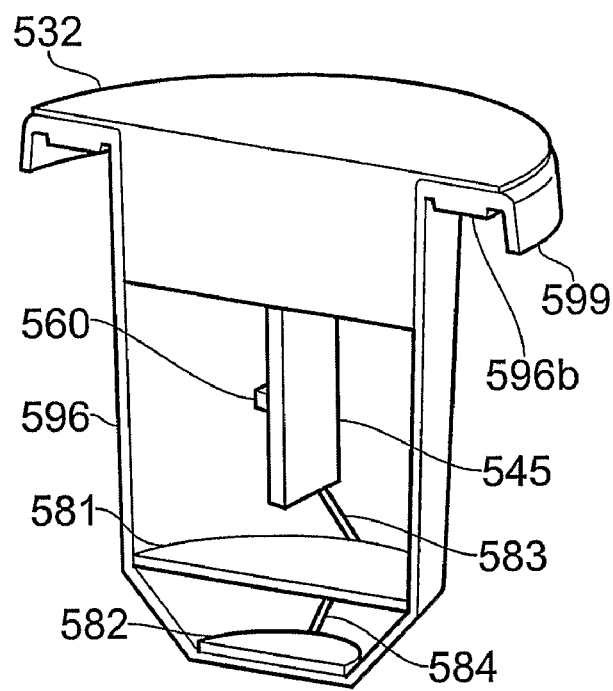
FIG. 8A is a section illustrating the RFID device of FIG. 6 incorporated into the insert of FIGS. 7A and 7B.
Figure 8B:
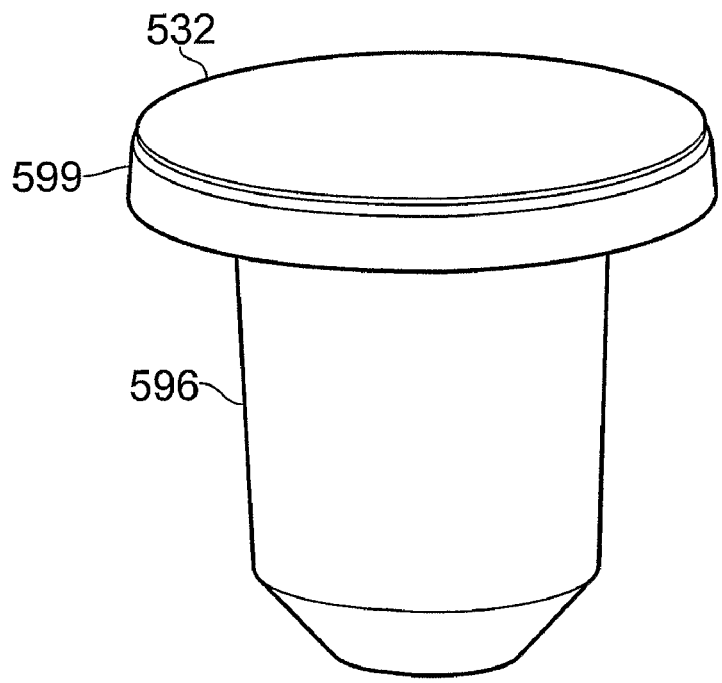
FIG. 8B is a perspective view of the RFID device/insert of FIG. 8A.

Referring now to FIGS. 7A and 7B the insert 595 has a cylindrical wall 596 which is closed at one end by a tapering wall 597 and end plate 598. Referring also to FIGS. 8A and 8B, the other end of the wall 596 is open and has the RFID device 515 inserted such that the base plate 532 rests on top of the cylindrical walls 596. The two copper plates 581, 582 are positioned such that the lower and smaller plate 582 rests on the end plate 598 and the upper and larger plate 581 rests on the junction between the cylindrical wall 596 and the tapering wall 597. The tag 540 is seen to depend straight down from the end plate 535. The connections 583, 584 between the tag 540 and the two plates 581, 582 may also be seen.

Figure 9:
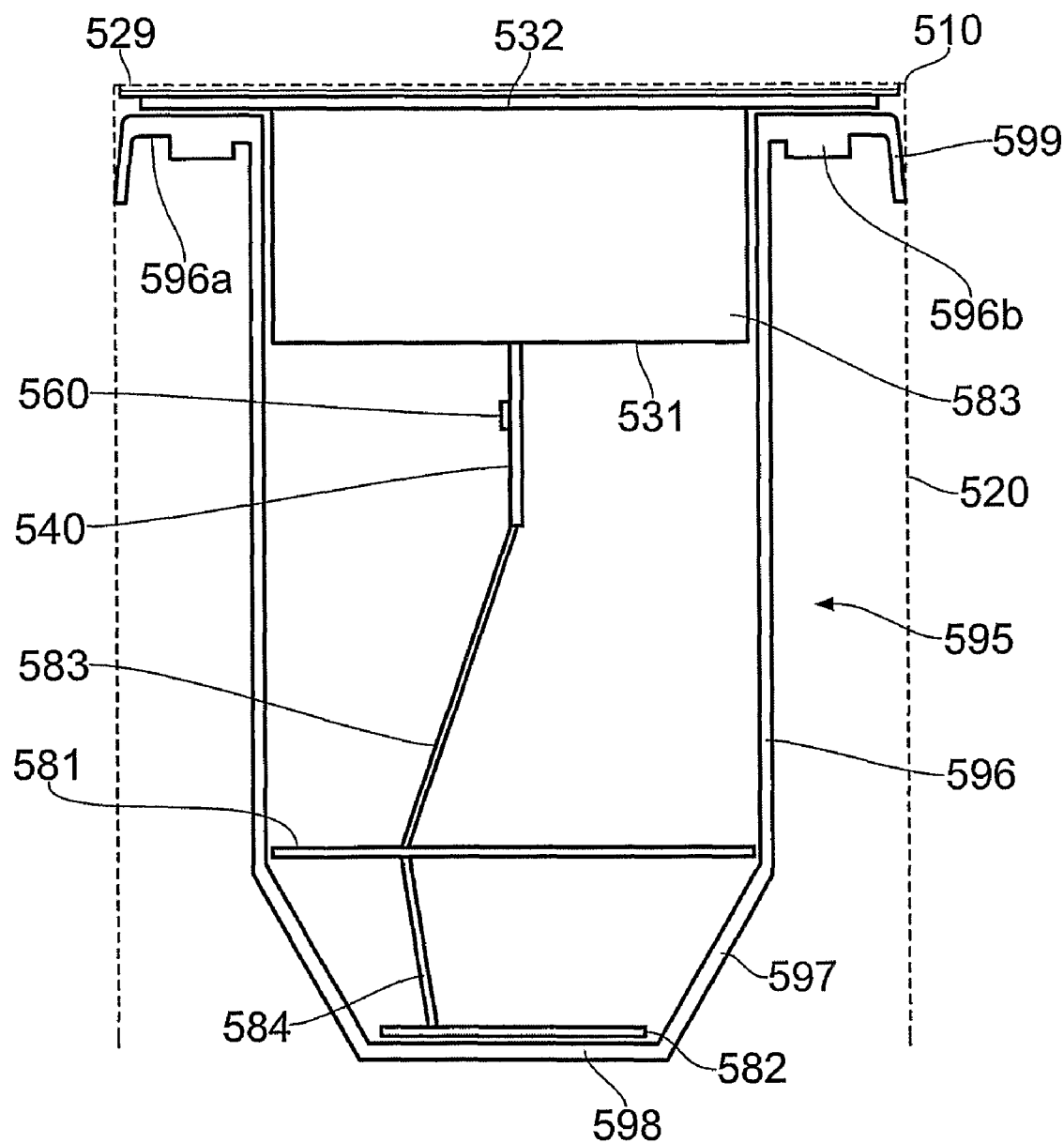
FIG. 9 shows diagrammatically the RFID device/insert of FIGS. 8A and 8B incorporated into a metal closure.

FIG. 9 shows the device 515 as described with reference to FIG. 6 mounted in the insert 595 which is mounted on the spacer 531. This insert 595 can be advantageously formed of extruded plastics material and is suitable for being itself inserted into a closure 510 (indicated in broken lines in FIG. 7) having a sealing wad 529.

Figure 10:
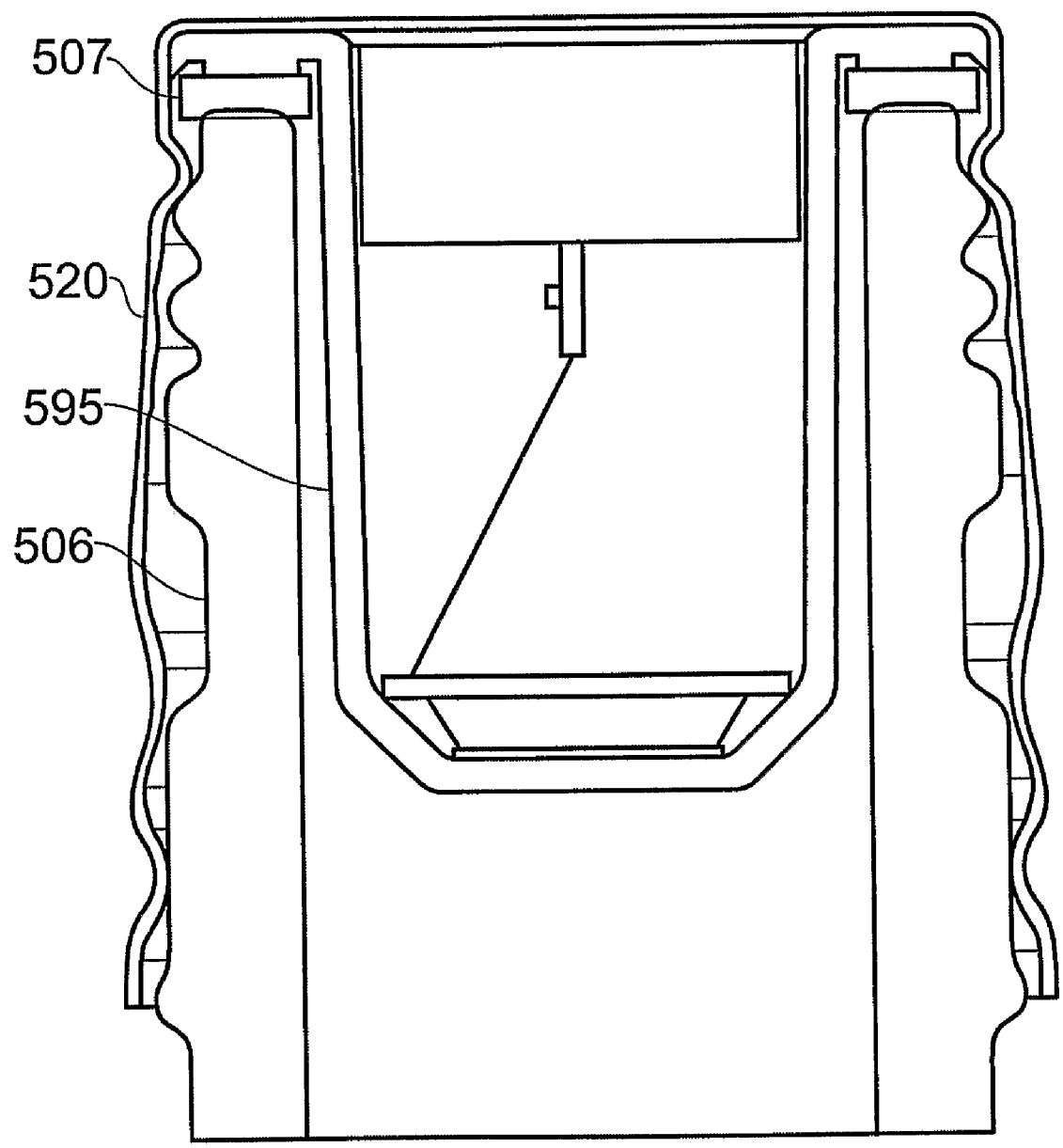
FIG. 10 is a section of the closure of FIG. 9 fitting onto a container neck.

The insert 595 also has a rim 599 which has a greater diameter than the cylindrical wall 596 and which acts to hold the insert 595 inside the closure 510. Further, between the rim 599 and the cylindrical wall 596, a stop block 596*b* is located on an annular flange 596*b* which extends around the circumference of the open end of the insert wall 596. The stop block 596*b* acts to limit axial movement onto the neck 506 of the associated container during fitting in conjunction with a sealing washer 507, in a manner well understood and as shown in FIG. 10. Once fitted to the neck 506, the closure 510 is "rolled" on to give the final form shown. The inward crimpings of the closure help to retain the insert 595 in position.

Since the base 532 of the spacer 531 is made of metal or other electrically conducting material it provides an electrical conduction area on the inside of the crown 530 of the closure 510 across a considerable area to promote conductivity between the two and ensure that the closure 510 may become one side of the dipole antenna.

Another aspect to the subject of electrical conduction is that of the nature of the material making up the associated container. Typically, such material will be glass. It has been found that glass can be slightly electrically conductive and therefore when a closure with an RFID device has been fitted, an electrical connection between the container and the closure can occur. This in turn has the effect that the whole of the container becomes part of one side of the dipole antenna encapsulating the other side. This encapsulation reduces the strength of the signal and radiation field and accordingly reduces the distance over which the tag 540 may be read.

To overcome this problem, the container needs to be electrically insulated from the closure, and this can be achieved by applying a layer of lacquer to the inside walls 511 of the closure 510. Other means are of course possible. Although the concept of increasing the distance over which the tag 540 may be read by contacting the antenna with a body of liquid has been described in relation to a container and closure, it should also be understood that this could also apply in fields other than packaging wherein there is no closure as such.

In the above-described embodiments, the circuit 550 has been shown as a loop. This loop is a characteristic of the AMS3981 chip and can be eliminated for other chips such that the circuit is only linearly connecting the closure 510 on one side and the antenna on the other. It has been found that using a loop 550 allows reading of an EM Marin 4222 chip in place of an AMS 3981 chip. In normal use when used with a dipole antenna the EM Marin 4222 chip does not require such a loop.

In such circumstances it may be possible to do without the substrate and merely have the chip electrically connected to the closure or end plate by means such as a copper wire.

In one embodiment, the distance over which the tag 540 may be read is 5 cm above the base 530 and 12 cm radially outwards from the sides 511 of the closure 510. When the antenna 580 is in contact with a liquid the distance increases to more than 50 cm.

An added advantage of the insert 595 is that it protects the RFID device from mechanical and chemical damage. Furthermore, it can be pre-assembled which helps in the manufacturing of the finished article.

Although the insert 595 has only been shown and described with reference to the embodiment in which the plates 581, 582 are employed. It will, of course, be understood that it is possible to fit other devices described herein inside such an insert.

Figure 11A:
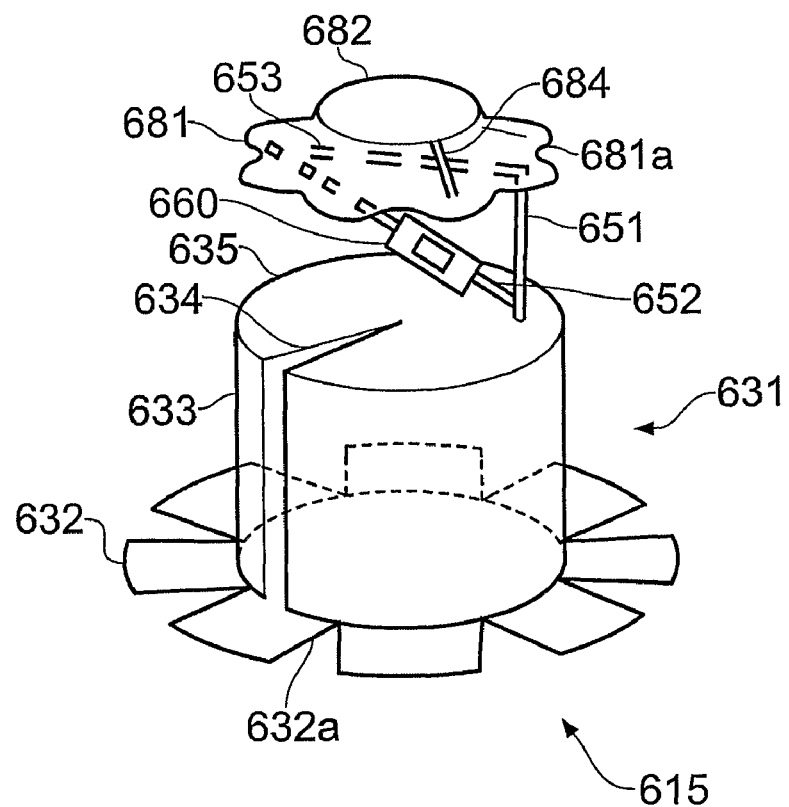
FIG. 11A is a perspective view of an RFID device formed according to the present invention.
Figure 11B:
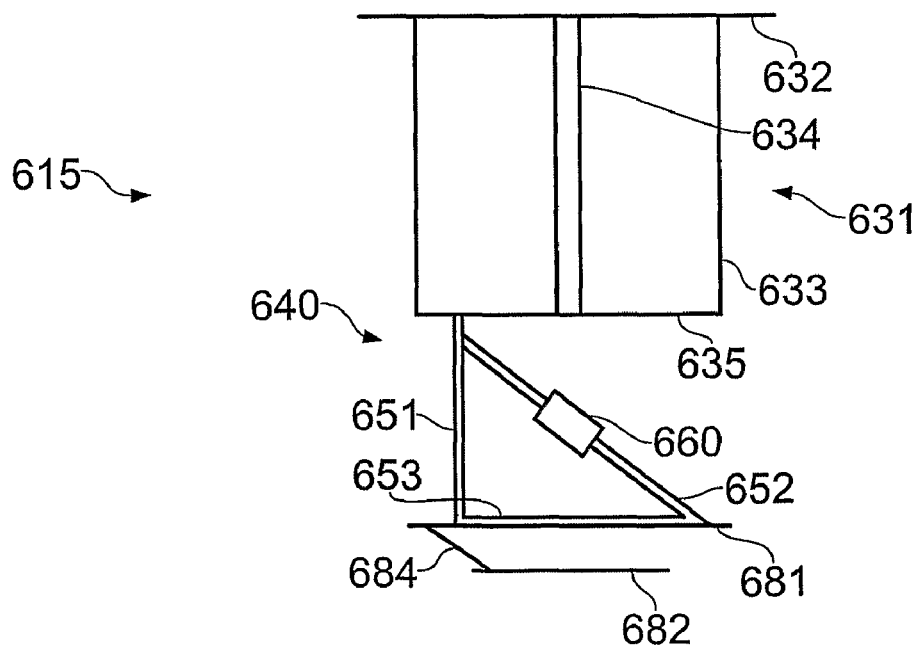
FIG. 11B is a side view of the RFID device of FIG. 11A.

Referring now to FIGS. 11A and 11B there is shown a device 615 formed according to an alternative embodiment. The device 615 is similar to those shown in FIGS. 5 and 6 and comprises a spacer 631 with a base 632 and a depending cylindrical wall 633 having an end plate 635. The device 615 also comprises a tag 640 connected to the plate 635 and an antenna arrangement comprising two disks 681, 682 connected to the tag 640.

The base 632 is a disk with a plurality of cut-outs 632*a* giving a discontinuous periphery which improves electrical conduction. The cylindrical wall 633 includes a wedge-shape notch 634 which prevents electrical current flowing in a loop around the wall 633.

The tag 640 is formed as a chip 660 supported on a triangular loop circuit 650. One leg 651 of the loop 650 connects to the plate 635 to the disk 681. A second leg 652 of the loop 650 also connects the plate 635 to the disk 681. The chip 660 is connected within the leg 652. A third leg 653 of the loop connects the legs 651, 652 together and runs across the disk 681. The disk 681 has cut-outs 681*a* in a similar way to the base 632 to improve electrical conduction. The disk 682 is joined to the disk 681 by a connector 684.

Figure 12:
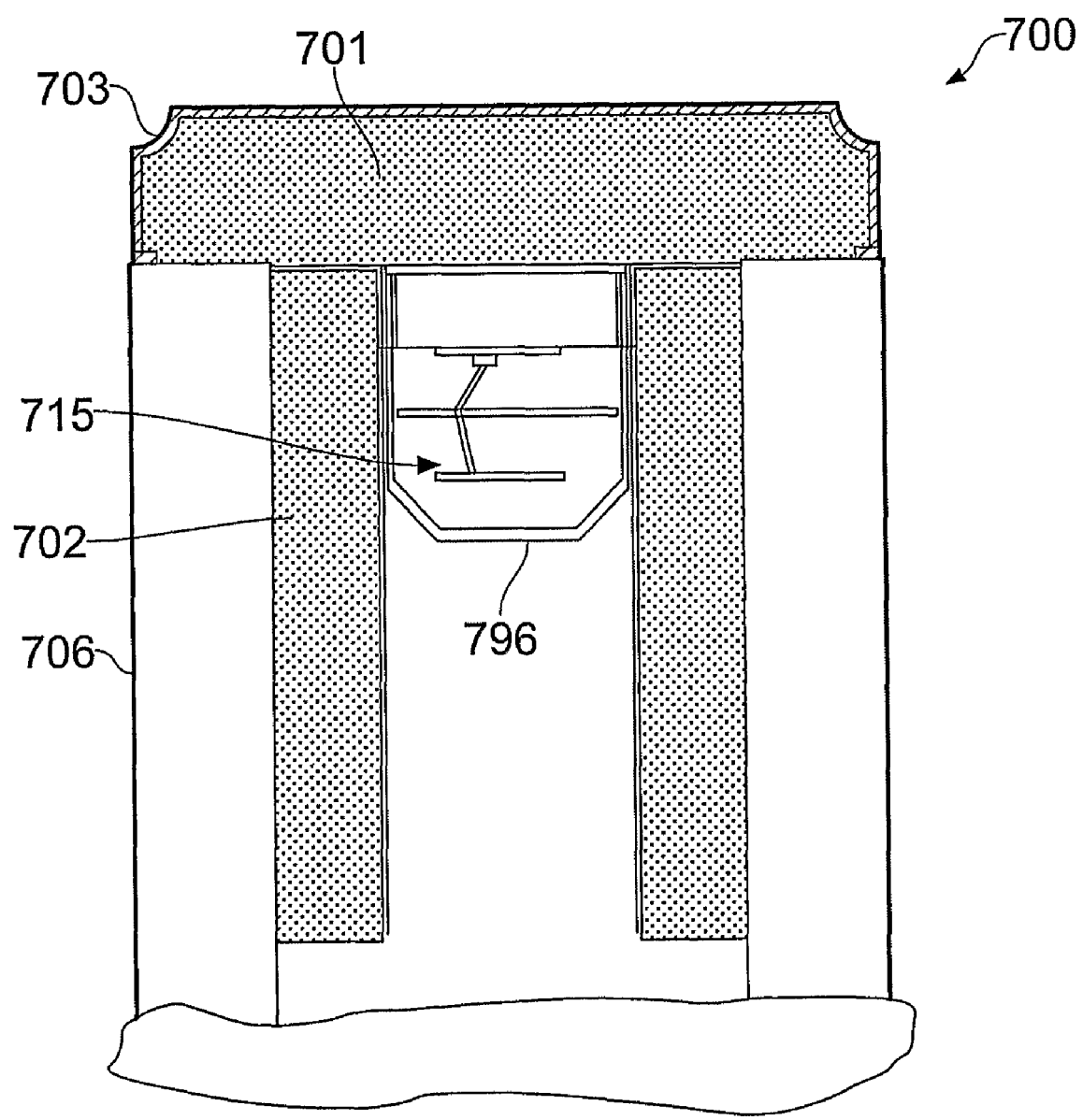
FIG. 12 is a section of a stopper formed in accordance with the present invention.

Referring now to FIG. 12, there is illustrated therein a further embodiment of the present invention as applied to a stopper member such as a cork for a wine or liqueur bottle or the like. Traditional stopper members are formed from cork but are being replaced by stopper members formed of plastics materials. Where such stopper members are used, these can comprise electrically conductive materials or be coated or clad therewith. An example of such a stopper member 700 mounted in a glass bottle neck 706 is shown.

The stopper member 700 comprises a head portion 701 and a hollow barrel portion 702 which forms a frictional fit in the neck 706 of the bottle. In the illustrated example, the head portion 701 of the stopper member is clad with an electrically-conductive outer skin 703 of metal which may be decorated or embossed. Within the hollow barrel portion 702 is mounted an insert 795 with a device 715 which is similar to that shown in FIG. 9 and therefore need not be further described.

The invention claimed is:

1. An RFID (Radio Frequency Identification) device for a closure comprising an electrically conductive shell, the device comprising a tag and antenna means, the tag comprising an RFID chip and the antenna means comprising one side of a dipole, the device being, in use, entirely located within the closure and spaced therefrom but electrically coupled thereto such that the closure becomes the other side of the dipole.

2. A closure and RFID device in combination, wherein the closure comprises an electrically-conductive shell and the RFID device comprises a tag and antenna means, the tag comprises an RFID chip, and the antenna means is one side of a dipole, the RFID device being entirely located within the metal closure and spaced from but electrically coupled to the closure such that the closure becomes the other side of the dipole.

3. The device according to claim 1, wherein the antenna means is a wire formed into a cone shape.

4. The device according to claim 1, in which the RFID device comprises a loop for connecting the chip and the antenna together.

5. The device according to claim 1, wherein the antenna means comprises at least one plate.

6. The device according to claim 1, wherein the device further comprises a spacer for spacing the tag from a crown of a closure.

7. The device according to claim 1, wherein the device is positioned inside an insert.

8. The device according to claim 1, wherein, the RFID chip is aligned with the a central vertical axis of the closure.

9. The device according to claim 1, wherein the container contains a liquid, and the antenna means is in contact with the liquid.

10. A closure and RFID device in combination, wherein the closure comprises an electrically-conductive shell and the RFID device comprises an RFID chip and antenna means, and the antenna means is adapted to be one side of a dipole, and the RFID chip being spaced from but electrically coupled to the electrically-conductive closure so that the closure becomes the other side of the dipole antenna, the closure and RFID device combination being associated with a body of liquid, and the antenna means being in contact with the body of liquid.

11. A closure and RFID device in combination, wherein the closure comprises a member which is arranged to provide a tight sealing fit within a neck of a container, the closure comprising electrically-conductive material and/or being coated with electrically-conductive material, and wherein the RFID device comprises an RFID chip and antenna means, and is accommodated within the member, and the antenna means is one side of a dipole, and the RFID device being entirely located within the closure and spaced from but electrically coupled to the closure so that the closure becomes the other side of the dipole.

12. A closure and RFID device in combination, wherein the closure comprises a member which is arranged to provide a tight sealing fit within a neck of a container, the closure comprising electrically-conductive material and/or being coated with electrically-conductive material, and the RFID device comprising an RFID chip and antenna means and the antenna means being adapted to be one side of a dipole, and the RFID chip being spaced from but electrically coupled to the electrically-conductive closure so that the closure becomes the other side of the dipole antenna, the closure and RFID device combination being associated with a body of liquid, and the antenna means being in contact with the body of liquid.

13. The combination of claim 2, wherein the antenna means is a wire formed into a cone shape.

14. The combination of claim 2, wherein the RFID device comprises a loop connecting the chip and antenna together.

15. The combination of claim 2, wherein the antenna means includes at least one plate.

16. The combination of claim 2, wherein the device includes a spacer for spacing the tag from a crown of the closure.

17. The combination of claim 2, wherein the device is positioned inside an insert.

18. The combination of claim 2, wherein the RFID chip is aligned with a central axis of the closure.

19. The combination of claim 2, wherein the container contains a liquid, and the antenna means is in contact with the liquid.

* * * * *